United States Patent
Porras et al.

(10) Patent No.: US 7,724,717 B2
(45) Date of Patent: May 25, 2010

(54) METHOD AND APPARATUS FOR WIRELESS NETWORK SECURITY

(75) Inventors: Phillip Andrew Porras, Cupertino, CA (US); Michael G. Corr, San Francisco, CA (US); Steven Mark Dawson, Belmont, CA (US); David Watt, Newark, CA (US); David Manseau, Boulder Creek, CA (US); John Peter Marcotullio, Morgan Hill, CA (US)

(73) Assignee: SRI International, Menlo Park, CA (US)

( * ) Notice: Subject to any disclaimer, the term of this patent is extended or adjusted under 35 U.S.C. 154(b) by 945 days.

(21) Appl. No.: 11/492,399

(22) Filed: Jul. 24, 2006

(65) Prior Publication Data

US 2007/0025265 A1 Feb. 1, 2007

Related U.S. Application Data

(60) Provisional application No. 60/701,871, filed on Jul. 22, 2005.

(51) Int. Cl.
*H04W 4/00* (2009.01)

(52) U.S. Cl. .................. 370/338; 370/332; 455/410; 455/411; 455/423; 455/425; 726/3; 726/4

(58) Field of Classification Search ......... 455/410–411, 455/423, 425; 370/338, 332, 335; 726/1–7
See application file for complete search history.

(56) References Cited

U.S. PATENT DOCUMENTS

| 5,440,758 | A | 8/1995 | Grube et al. |
|---|---|---|---|
| 5,689,563 | A | 11/1997 | Brown et al. |
| 5,706,333 | A | 1/1998 | Grenning et al. |
| 5,870,672 | A * | 2/1999 | Stoddard et al. ............ 455/410 |
| 5,905,949 | A | 5/1999 | Hawkes et al. |
| 5,956,634 | A | 9/1999 | Otterson et al. |
| 6,023,619 | A * | 2/2000 | Kaminsky ................... 455/411 |
| 6,259,907 | B1 | 7/2001 | Bellamy et al. |
| 6,674,403 | B2 | 1/2004 | Gray et al. |
| 7,047,014 | B1 | 5/2006 | Friday et al. |
| 7,142,108 | B2 * | 11/2006 | Diener et al. ............. 340/539.1 |
| 7,376,235 | B2 * | 5/2008 | Kuehnel ..................... 380/267 |
| 2002/0066041 | A1 | 5/2002 | Lemke |
| 2002/0197978 | A1 | 12/2002 | Zavidniak |
| 2003/0008668 | A1 | 1/2003 | Perez-Breva et al. |

(Continued)

OTHER PUBLICATIONS

S.R. Bhatikar, S.P. Khatri, G. Grudi, N. Jayakumar, T. Stromann, J. Dobsa, and R. Mahajan, "Classification Techniques for GSM Emitters," unpublished technical paper,University of Colorado,http://csel.cs.colorado.edu/~strohman/GSM_paper.pdf, retrieved Nov. 25, 2005.

(Continued)

*Primary Examiner*—George Eng
*Assistant Examiner*—Marcos L Torres (57) ABSTRACT

In one embodiment, the present invention is a method and apparatus for wireless network security. In one embodiment, a method for securing a wireless computing network includes receiving a communication from an unidentified transmitter, identifying the transmitter in accordance with a fingerprint generated from one or more radio frequency signal characteristics extracted from the communication, and taking action in response to an identity of the transmitter.

55 Claims, 8 Drawing Sheets

U.S. PATENT DOCUMENTS

| | | | |
|---|---|---|---|
| 2003/0045270 A1 | 3/2003 | Agrawal et al. | |
| 2003/0084321 A1 | 5/2003 | Tarquini et al. | |
| 2003/0135762 A1 | 7/2003 | Macaulay | |
| 2003/0166398 A1 | 9/2003 | Netanel | |
| 2003/0217289 A1 | 11/2003 | Ammon et al. | |
| 2003/0237000 A1 | 12/2003 | Denton et al. | |
| 2004/0103314 A1 | 5/2004 | Liston | |
| 2004/0107219 A1 | 6/2004 | Rosenberger | |
| 2004/0137915 A1 | 7/2004 | Diener et al. | |
| 2004/0157556 A1 | 8/2004 | Barnett et al. | |
| 2004/0162995 A1 | 8/2004 | Muaddi et al. | |
| 2004/0166818 A1* | 8/2004 | Karlsson | 455/115.1 |
| 2004/0252837 A1 | 12/2004 | Harvey et al. | |
| 2005/0037733 A1 | 2/2005 | Coleman et al. | |
| 2005/0079859 A1 | 4/2005 | Eakin | |
| 2005/0172153 A1* | 8/2005 | Groenendaal | 713/201 |
| 2005/0181793 A1 | 8/2005 | Netanel | |
| 2005/0202800 A1 | 9/2005 | Wang | |
| 2005/0213553 A1 | 9/2005 | Wang | |
| 2006/0181394 A1 | 8/2006 | Clarke | |

OTHER PUBLICATIONS

C. He and J.C. Mitchell, "Analysis of the 802.11i 4-Way Handshake," in Proceedings of the Third ACM International Workshop on Wireless Security (WiSe'04), pp. 43-50. Philadelphia, PA, Oct. 2004.

A. Mishra and W.A. Arbaugh, "An Initial Security Analysis of the IEEE 802.1X Standard," University of Maryland, Department of Computer Science and University Institute for Advanced Computer Studies, Technical Report CS-TR-4328 and UMIACS-TR-2003-10, Feb. 2002.

J. Lindeman and F. Bulk, "WLAN Security Monitors-Watching the Waves," Network Computing Magazine, Mar. 4, 2004. http://www.nwc.com/showitem.jhtml?articleID= 18200309.

P. A. Porras, "An Analysis of 802.11 Wireless Intrusion Detection—Capabilities, Limitations, and Current Directions," Technical Report, SRI International, Jan. 15, 2004.

J.R. Walker, "Unsafe at Any Key Size: An Analysis of the WEP Encapsulation," IEEE Doc 802.11-00/362, Oct. 2000.

Light Reading, Unstrung Insider, "Intrusion Detection and Prevention for 802.11 Wireless LAN," vol. 3, No. 1, Jan. 2004.

A. Adya, R. Chandra, and L. Qiu, "Architecture and Techniques for Diagnosing Faults in IEEE 802.11 Infrastructure Networks," Proceedings of ACM 10th International Conference on Mobile Computing and Networking, Philadelphia, PA, Sep. 2005. copy consists of 15 unnumbered pages.

U. Lindqvist, and P.A. Porras, "Detecting Computer and Network Misuse Through the Production-based Expert System (P-BEST)," Proceedings of the 1999 IEEE Symposium on Security and Privacy, Oakland, CA, May 1999.

A, Valdes and K. Skinner, "Adaptive, Model-based Monitoring for Cyber Attack Detection," Proceedings of Recent Advances in Intrusion Detection, Toulouse, France, Oct. 2000.

Department of Defense, DoD Directive 8100.2, "Use of Commercial Wireless Devices, Services, and Technologies in the Department of Defense (DoD) Global Information Grid (GIG)," Apr. 2004.

Victor R. Garza, "Wireless IDSes Help Network Admins Keep an Ear to the Air," InfoWorld, May 2004. http://www.infoworld.com/articte/04/05/14/20TCwids_1.html.

J. Hall, M. Barbeau, E. Kranakis, "Detection of Transient in Radio Frequency Fingerprinting Using Signal Phase," Proceedings 3rd IASTED International Conference on Wireless and Optical Communications, Banff, Alberta, Canada, Jul. 14-16, 2003. copy consists of 6 unnumbered pages.

J. Hall, M. Barbeau, and E. Kranakis, "Enhancing Intrusion Detection in Wireless Networks Using Radio Frequency Fingerprinting," Communications, Internet and Information Technology. St Thomas, US Virgin Islands, Nov. 22-24, 2004. copy consists of 6 unnumbered pages.

J.Hall, M. Barbeau, and E. Kranakis, "Using Mobility Profiles for Anomaly-based Intrusion Detection in Mobile Networks," Network and Distributed System Security Symposium Pre-Conference Workshop on Wireless and Mobile Security, San Diego, CA, Apr. 2005. copy consists of 2 unnumbered pages.

J. Hall, M. Barbeau, and E. Kranakis, "Anomaly-based Intrusion Detection Using Mobility Profiles of Public Transportation Users," Proceedings IEEE International Conference on Wireless and Mobile Computing, Networking, and Communications, Montreal, Quebec, Canada, 2005. copy consists of 8 unnumbered pages.

M. Barbeau, J. Hall, and E. Kranakis, "Detecting Impersonation Attacks in Future Wireless and Mobile Networks," Proceedings of Mobile Ad-hoc Networks and Sensors workshop, Singapore, Sep. 2005, copy consists of 16 unnumbered pages.

J. Hall, M. Barbeau, and E. Kranakis, "Detecting Rogue Devices in Bluetooth Networks using Radio Frequency Fingerprinting," To appear in Proceedings of the IASTED International Conference on Communications and Computer Networks, Lima, Peru, Oct. 2006. Downloaded Sep. 15, 2006, from http://www.scs.carleton.ca/~jhall2/publications.html. Copy consists of 6 unnumbered pages.

S.R. Bhatikar, S.P. Khatri, G. Grudi, N. Jayakumar, T. Stromann, J. Dobsa, and R. Mahajan, "Classification Techniques for GSM Emitters," unpublished technical paper,University of Colorado,http://csel.cs.colorado.edu/~strohman/GSM_paper.pdf retrieved Nov. 25, 2005.

C. He and J.C. Mitchell, "Analysis of the 802.11i 4-Way Handshake," in Proceedings of the Third ACM International Workshop on Wireless Security (WiSe'04), pp. 43-50. Philadelphia, PA, Oct. 2004.

A. Mishra and W.A. Arbaugh, "An Initial Security Analysis of the IEEE 802.1X Standard," University of Maryland, Department of Computer Science and University Institute for Advanced Computer Studies, Technical Report CS-TR-4328 and UMIACS-TR-2003-10, Feb. 2002.

* cited by examiner

METHOD AND APPARATUS FOR WIRELESS NETWORK SECURITY

CROSS REFERENCE TO RELATED APPLICATIONS

This application claims the benefit of U.S. Provisional Patent Application No. 60/701,871, filed Jul. 22, 2005, which is herein incorporated by reference in its entirety.

FIELD OF THE INVENTION

The present invention relates generally to wireless computer networks and relates more particularly to detecting and preventing malicious activity in wireless computer networks.

BACKGROUND OF THE INVENTION

In recent years, the growth in wireless technology for local area networking, mobile computing and "hotspot" services has been nothing short of explosive. At the same time, there have been discoveries of egregious security vulnerabilities, privacy concerns and a general recognition that failure diagnosis and recovery must be made affordable and expedient.

Wireless networks essentially eliminate the traditional security barriers offered by wired networks and give attackers direct access to both observe and interject communications with any wireless networks in range. Thus, no matter the degree to which encryption and authentication are employed, the need to monitor for and defend against illicit usage and to rapidly diagnose communication disruptions in wireless network environments is critical.

Though products have been developed to address wireless intrusion detection and fault management concerns, these devices are generally insufficient to meet the security demands of wireless network environments. Tremendous resources are expended in identifying malicious traffic, and many of these efforts are still easily subverted. For example, traditional filtering based on medium access control (MAC) address can be subverted by simply forging a MAC address, making signals and sessions approximately free for anyone in the vicinity to generate.

Thus, there is a need in the art for a method and apparatus for identifying wireless transmitters.

SUMMARY OF THE INVENTION

In one embodiment, the present invention is a method and apparatus for identifying wireless transmitters. In one embodiment, a method for identifying a transmitter in a wireless computing network includes extracting one or more radio frequency signal characteristics from a communication from the transmitter and generating a fingerprint of the transmitter in accordance at least one of the extracted radio frequency signal characteristics.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to security for wireless computing networks. Embodiments of the present invention exploit a rich set of information from the physical (radio frequency medium) layer that is normally discarded by typical wireless network security systems, in order to create "fingerprints" of wireless network devices. The signal waveforms of, for example, Institute of Electrical and Electronics Engineers (IEEE) 802.11 transmissions produced by a wireless interface card (WIC) exhibit detectable signal artifacts that can enable one to identify the set of components, manufacturing tolerances, configuration and control firmware that compose the WIC's RF emitter system.

This fingerprinting capability can be adapted to support transmitter-based access control, wireless local area network (LAN) intrusion detection, malicious or stolen device tracking, clone detection and product market surveys, among other applications. For example, the ability to identify wireless network devices can allow a wireless network security system to better defend against intrusion by rapidly authenticating authorized devices (and potentially their users) and by detecting significant deviations in transmission patterns that represent device masquerading (e.g., "spoofing"), malicious traffic injection or man-in-the-middle attacks. Wireless network access points could also be fingerprinted to confirm that their transmissions are valid and not spoofed.

Figure 1:
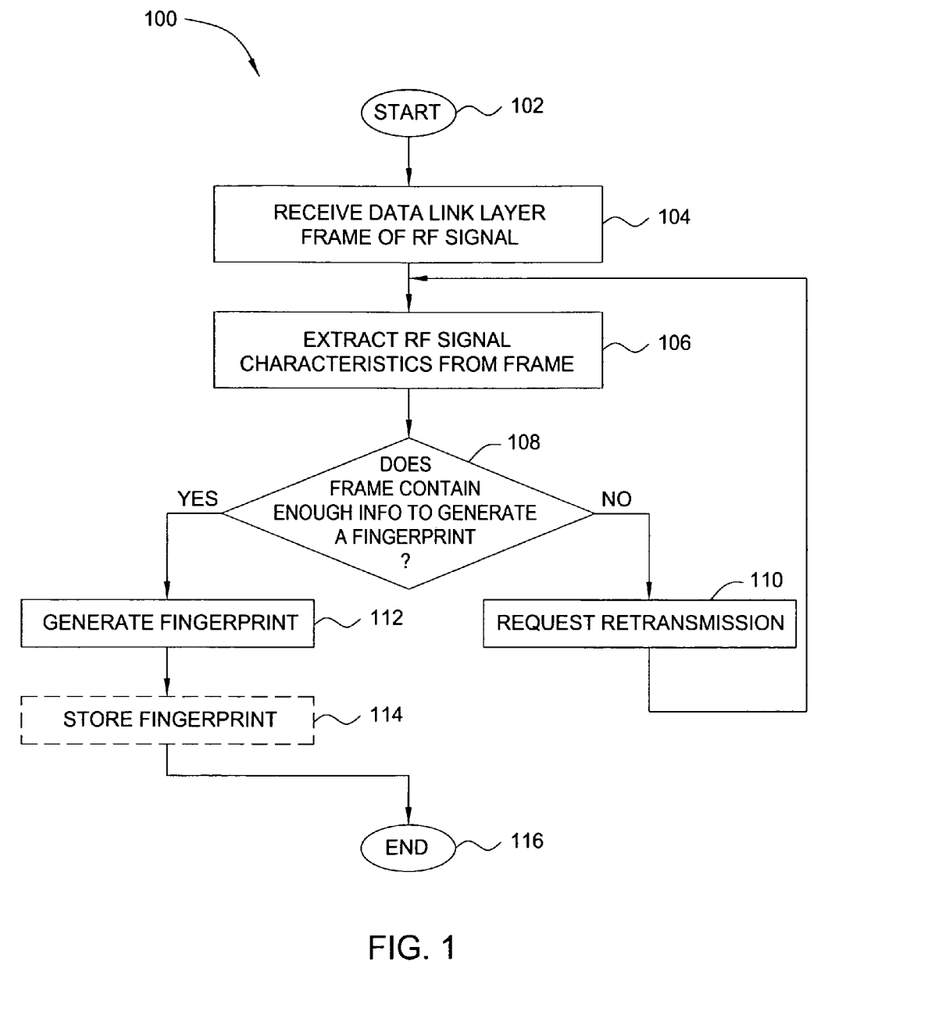
FIG. 1 is a flow diagram illustrating one embodiment of a method for "fingerprinting" a wireless computing device, according to the present invention.

FIG. 1 is a flow diagram illustrating one embodiment of a method 100 for "fingerprinting" a wireless computing device (or wireless interface card (WIC)), according to the present invention. The method 100 may be implemented, for example, at a network security device through which wireless network communications flow (e.g., an access point). In one embodiment, the method 100 is implemented as a means of registering a wireless computing device as authorized to access a wireless computing network (i.e., before the wireless computing device is deployed for use). In one embodiment, the method 100 is implemented within the context of an IEEE 802.11 wireless network. In further embodiments, the method 100, and the various other methods described herein, are also applicable to other types of RF communication networks, e.g., IEEE 802.15 wireless networks, multiple-input-multiple-output (MIMO) wireless communication systems, Worldwide Interoperability for Microwave Access (WiMAX) technology and radio frequency identification (RFID) systems.

The method 100 is initialized at step 102 and proceeds to step 104, where the method 100 receives a data link layer frame of a radio frequency (RF) signal from a wireless device. In one embodiment, the environment in which the data link layer frame is received is such that the method 100 can be substantially sure that the wireless device is the only device that is transmitting (e.g., so that no other device signals or interference will be confused with signals coming from the wireless device). In one embodiment, MAC filtering is employed to separate out received signals and discard those emitted from other devices, such as access points.

In step 106, the method 100 extracts RF physical signal characteristics from the received data link layer frame. In one embodiment, these RF signal characteristics are extracted using a vector signal analyzer. In one embodiment, the RF signal characteristics are those that can be broadly classified as representing frequency and timing-based analyses (e.g., such as carrier offset, carrier leakage power ratio and sample clock offset), signal power-off sequencing (e.g., such as slope and synchronization error), signal power-on sequencing (e.g., such as slope angle, duration, step locations and step durations) and sideband characterization. In one embodiment, the extracted RF signal characteristics include one or more characteristics that are at least one of: device-unique (i.e., demonstrative of variances among individual devices), model-unique or batch-unique (i.e., demonstrative of variances among device models, or manufacturing batches) and session-unique (i.e., demonstrative of variances among communication sessions). In a further embodiment, the extracted RF signal characteristics include characteristics that remain relatively stable (e.g., can produce repeatable results) under varying environmental conditions.

In one embodiment, device-unique characteristics include at least one of: carrier signal frequency (manufacturing variances in transmitter implementation provide a unique base frequency offset within the tolerance allowed by the protocol specification), clock offset and jitter (extraction of the crystal frequency at high-fidelity can reveal unique crystal characteristics, manufacturing design and material composition), phase noise (minor crystal instabilities may produce unique jitter or phase shift) and sideband characteristics (the sideband of a transmitted signal is influenced by device-specific external shielding and filter variance).

In one embodiment, model-unique characteristics include at least one of: signal drift and/or shift recovery characteristics (carrier signal drift is influenced by environmental conditions including thermal variance within the card), signal constellation stability (manufacturing tolerance allows a unique variance in the modulation due to phase shifting imperfections), signal amplitude rise time (implementation variances produces unique measurable rise times from one transmission amplitude level to another among devices) and active gain control (how a device's active gain control responds to a drop or gain in signal strength from the access point depends on the characteristics of the algorithm that the vendor employs to adjust the signal intensity).

In one embodiment, session-unique characteristics include at least one of: signal strength intensity, angle of arrival and angle/delay spread (a difference in the intensity of the transmitted signal, the angle of arrival or the multipath echo effects may indicate that the wireless device is transmitting from a different physical location). These session-unique characteristics can also be used to estimate the location of the transmitting wireless device, for example using signal triangulation and/or other techniques to estimate the geographic position of a device transmission within a wireless network perimeter.

In another embodiment, further RF signal characteristics that may be extracted in accordance with step 106 include at least one of: a data rate of an orthogonal frequency-division multiplexing (OFDM) frame, a number of symbols in a frame, common pilot error (i.e., the difference between the measured and ideal pilot subcarrier symbols, indicative of residual phase and frequency settling following the preamble), error vector magnitude (i.e., the root mean square value of the error vector magnitudes over the entire burst, including all data symbols for all 52 subcarriers), pilot subcarrier error vector magnitude (i.e., the root mean square value of the error vector magnitudes of the four pilot subcarriers for all symbols over the entire burst), center frequency error (i.e., the measured difference between the center frequency of the OFDM frame and the specified center frequency of the channel), IQ offset or I/O origin offset (e.g., indicative of the magnitude of the carrier feedthrough signal), quadrature skew error (e.g., indicative of the orthogonal error between the I and the Q signals), IQ gain imbalance (i.e., the ratio of the magnitudes of the I symbol and the Q symbol), synchronization correlation (i.e., a cross correlation of the preamble synchronization of the measured signal to an ideal signal) and symbol clock frequency error (i.e., the difference between the ideal and actual symbol clock frequency).

In one embodiment, the combination of RF characteristics used to fingerprint a wireless device is configurable (e.g., by an administrator). In an alternative embodiment, a fixed collection of signal characteristics is used. In a further embodiment, the method 100 also extracts data content and/or signal strength and angle of arrival information from the received RF signal. In a further embodiment still, characteristics of higher-level protocols (e.g., 802.11, Internet Protocol, Transmission Control Protocol, User Datagram Protocol and the like) may be combined with RF characteristics in order to produce a fingerprint of a wireless device.

In another embodiment, the multimodal behaviors of the RF signal characteristics aid in refining the fingerprinting process. For example, certain signal characteristics may exhibit values in multiple distinct, overlapping or nonoverlapping, ranges (modes). When these value ranges exhibit a strong correlation with other measurable signal characteristics, the correlation may itself be treated as a derived characteristic that may aid in discriminating devices that are otherwise difficult to discriminate because of possibly overlapping value ranges among their multiple modes. In other cases, the multimodal behavior may be correlated to a device or environmental characteristic that is not directly or easily measurable from the received signal (such as transmit power or temperature), and the correlation to a multimodal attribute may aid in estimating the values of such device and environmental characteristics. Moreover, even if correlations between multimodal behavior and other characteristics are not known, the existence of multimodal behavior can help distinguish devices that exhibit multimodal behavior from those that do not.

Referring back to FIG. 1, in step 108, the method 100 determines whether the extracted RF signal characteristic data is sufficient to generate a "fingerprint" of the transmitting wireless device. If the method 100 concludes in step 108 that there is insufficient information to generate a fingerprint, the method 100 proceeds to step 110 and requests an additional communication from the transmitting wireless device, e.g., by requesting retransmission of the data link layer frame. In one embodiment, the request for retransmission is replaced or augmented with a request to provide additional data link layer frames (i.e., in addition to the frame to be retransmitted). Once the additional data link layer frame(s) are received from the transmitting device, the method 100 returns to step 106 and proceeds as described above to re-attempt fingerprint generation.

Alternatively, if the method 100 concludes in step 108 that the data link layer frame (or frames) contains sufficient information to generate a fingerprint, the method 100 proceeds to step 112 and produces a fingerprint of the wireless device from which the RF signal was received. This fingerprint comprises a collection of at least one of the extracted RF signal characteristics (e.g., signal attribute expectations, based on the collected data) and thereby identifies the wireless device from which the RF signal was received, regardless of the MAC address that is reported within the data link layer frame. As described in greater detail below, future transmissions originating from the wireless device may be compared to these signal attribute expectations in the furtherance of various security applications.

In one embodiment, a Bayesian reasoning engine is used to dynamically construct an expectation of the RF signal characteristics of the wireless device's associated transmission events. Each transmission event contributes to an incrementally refined probabilistic model of the wireless device's expected RF signal characteristics, with an aging function that allows the probabilistic model to adapt to more recent transmission behavior (possibly due to thermal changes), creating a probabilistic measure of similarity that can later be used to compare a plurality of device fingerprints (as described in greater detail below). In this embodiment, extracted RF signal characteristics are modeled as observable nodes in a Bayes network. In further embodiments, other non-Bayesian schemes are implemented in order to dynamically construct fingerprints of transmitting wireless devices.

In some embodiments, a subset of the RF signal characteristics that allows for best discrimination among transmitting wireless devices is selected to create a "light-weight" fingerprint, thereby reducing computational costs. The use of a "light-weight" fingerprint may also be desirable in high-traffic situations, where a graceful degradation of service is the trade-off for higher throughput. In one embodiment, the subset of characteristics selected to produce a "light-weight" fingerprint includes one or more of the following: signal strength intensity, angle of arrival, angle spread and delay spread. In one such embodiment, a plurality of "light-weight" fingerprints of varying accuracies could be produced. In a further embodiment still, "light-weight" fingerprints could be produced for most packets, while "fuller" fingerprints are produced only occasionally (e.g., every $n^{th}$ packet or at predetermined time intervals). In one embodiment, the production of "light-weight" fingerprints is tunable (e.g., by an administrator).

In one embodiment, a measure of tolerance is computed based on the variation in RF signal characteristics of the received data link layer frame(s) as traffic is gathered in the fingerprint learning process. This tolerance represents a permissible deviation from a stored fingerprint measurement, and may be used in later processes to identify and/or track the transmitting wireless device, as described in greater detail below. In one embodiment, the tolerance is sufficient to include all of the observed variation in the RF signal characteristics. In another embodiment, the tolerance is represents a tighter band (e.g., by removing outlying values).

In another embodiment, methods used to produce the fingerprint of the wireless device include techniques for obtaining transmission positions or a combination thereof, such as known angle of arrival, time of arrival, time difference of arrival and received signal strength.

In optional step 114 (illustrated in phantom), the method 100 stores the fingerprint produced in step 112 (e.g., in a fingerprint database). By storing the fingerprint, the transmitting wireless device may be recognized during subsequent attempts to access the wireless computing network (e.g., as an authorized device or as a known source of malicious traffic). Moreover, the stored information may aid in monitoring the transmitting wireless device during an ongoing wireless session (e.g., by comparing later-measured fingerprints of the same device). For example, later-measured fingerprints may indicate that a known wireless device has moved physically to another location or is apparently in two physical locations at one time.

In one embodiment, the database entry for a fingerprint further includes a corporate asset identifier. This may aid, for example in locating a misplaced laptop computer (e.g., by flagging the fingerprint of the device corresponding to the asset identifier as "missing", such that an alert will be generated if traffic is detected transmitting from the missing device). The method 100 then terminates in step 116.

In a further embodiment of the method 100, in addition to characterizing extracted RF signal characteristics, the turn-on and turn-off sections of each frame are also characterized. For example, some WICs show sections of carrier power with no modulation, either before or after an 802.11g frame. Some WICs may be clearly distinguished by these features, which are affected, at least in part, by firmware that controls the timing of power amplitude switching and the digital-to-analog converter (DAC) that modulates the carrier.

In one embodiment, the turn-on and turn-off sections are characterized by fitting the waveform power log-magnitude to a polynomial curve. In this embodiment, the inner product of a section of the log-magnitude power waveform (either turn-on or turn-off) and the Legendre polynomials from order one through six is taken. Legendre polynomial coefficients generated from the log-magnitude power within the turn-on and turn-off sections are then stored as features on a per-frame basis. In another embodiment, the turn-on and turn-off sections are characterized by nominating a carrier-only region based on phase constancy. This embodiment involves nominating the carrier-step region as the longest time section, within a specified search region, where the magnitude of the time derivative of the I/Q phase is consistently below a given threshold. The extracted features are then turn-on/off step duration, turn-on/off time placement (i.e., the carrier-step start time, referenced to frame start/end time) and turn-on/off normalized power level (e.g., normalized against the average power of the frame's OFDM training sequence). In either case, turn-on and turn-off sections are defined with respect to a symbol start time definition as provided, for example, by a vector signal analyzer. Turn-off sections are also dependent on the number of symbols in the data link layer frames.

The method 100 thereby provides a means of identifying wireless devices using a wireless computing network. Using information that is normally discarded by conventional wireless network security systems, wireless devices can be "fingerprinted" in accordance with their RF signal characteristics. In some embodiments, fingerprinting capability in accordance with the method 100 is integrated directly into a wireless LAN infrastructure as an embedded application with, for example, an Application-Specific Integrated Circuit (ASIC) or Field Programmable Gate Array (FPGA) to create a physical frame characteristic record.

Fingerprints as described herein may be used to identify a transmitting wireless device in several ways. For example, fingerprints may be used to detect when two independent transmissions were not made from the same transmitter (e.g., by examining angle of arrival, signal strength, angle spread and/or delay), thereby allowing the detection of traffic injection within ongoing wireless sessions. Additionally, fingerprints may be used to determine when two transmitters belong to the same or to different manufacturers or product models (e.g., by detecting chipset, firmware, power, amplifier and/or shielding characteristics and other product-specific components). In further examples, fingerprints may be used to differentiate between transmitters within the same product line (e.g., through subtle differences in firmware configuration, component variability and/or other high-fidelity signal characteristics that are influenced by tolerances in transmitter assembly), offering the potential to provide access control services that offer more robust and complementary protection to pure layer 2 MAC filtering. Moreover, fingerprints may be used to validate an assertion that an RF transmission containing a given MAC address was indeed emitted by the true device that is assigned the given MAC address (e.g., by examining signal amplitude, rise and fall sequencing, sideband characteristics and other signal attributes that are influenced by minor device implementation variances). Device-unique identification provides the potential for high-quality access control for filtering RF transmissions from all but authorized devices, and can also facilitate signal-based malicious or stolen device tracking, among other advanced security management services.

Moreover, a wireless device's fingerprint may be allowed to "evolve" over time by incorporating a weighted update procedure, whereby RF signal characteristics extracted from more recent transmissions are weighted more heavily than RF signal characteristics extracted from less recent transmissions.

In one embodiment, the method 100 is executed as part of a payment process (e.g., for access through a "hot spot" wireless computing network access point). In this embodiment, data link layer frames received from unauthorized devices are not dropped, but are instead processed with a flag to the network stack that indicates that the unauthorized device has not paid for access to the network. This would direct the unauthorized device toward a web session to enable (pay for) communication with the hot spot. In an alternative embodiment, identifying information (e.g., biometric data, identification numbers such as an employee, student or library ID, a password, a digital certificate and the like) about the human user of the transmitting wireless device is required instead of monetary payment. Thus, instead of collecting credit card or other payment details, the web session would collect identification information and verify it according to administrator defined criteria (e.g., matching the credentials to an authorized user). This embodiment allows an intrusion prevention system to not only identify the transmitting device, but also the human user of the device.

Figure 8:
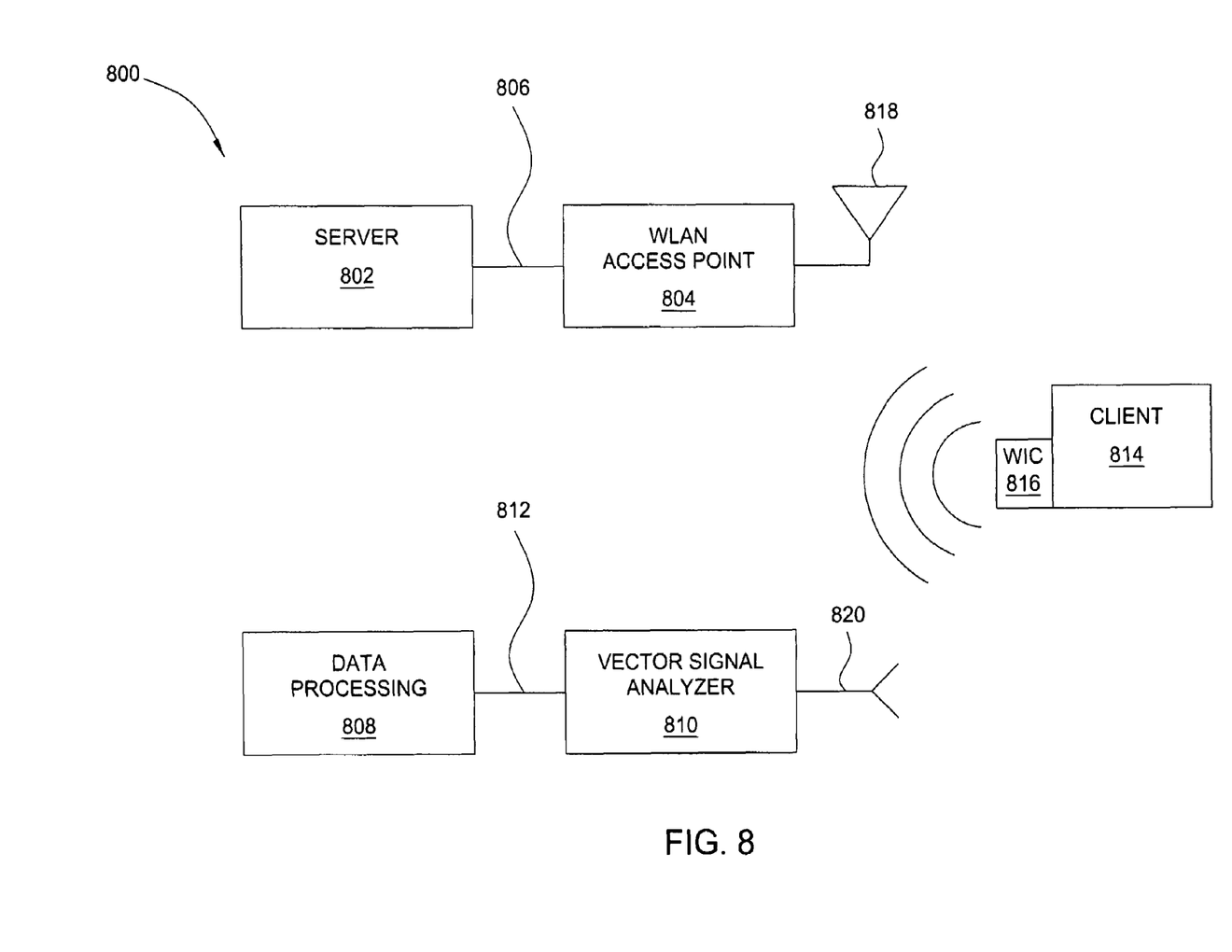
FIG. 8 is a schematic diagram illustrating an exemplary wireless computing network within which an RF fingerprinting scheme such as that described with reference to FIG. 1 may be implemented.

FIG. 8 is a schematic diagram illustrating an exemplary wireless computing network 800 within which an RF fingerprinting scheme such as that described with reference to FIG. 1 may be implemented. The network 800 is configured to capture RF data from transmitting wireless devices, such as wireless client 814, and process the captured data in order to control access to the network 800. In one embodiment, the network 800 is an IEEE 802.11 wireless network.

To this end, the network 800 includes at least one server 802, at least one wireless client 814 and a vector signal analyzer 810. The server 802 is communicatively coupled (e.g., via an Ethernet 806) to a wireless LAN access point 804 (having an antenna 818). When the client 814 wishes to communicate with the server 802, the client 814 must first be registered or authenticated by the access point 804.

In order to register or authenticate the client 814, the vector signal analyzer 810 captures and records the RF transmissions emitted from the client's wireless interface card 816 (e.g., using a "sniffer" antenna 820). The vector signal analyzer 810 is communicatively coupled (e.g., via a firewire 812) to a data processing personal computer (PC) 808, which calculates and displays RF signal characteristics extracted from the WIC's transmissions.

The vector signal analyzer 810 therefore functions as a data collection engine that facilitates the fingerprinting process. To this end, the vector signal analyzer 810 performs one or more of the following functions: high-linearity RF downconversion (i.e., no intermodulation or signal clipping), high-speed analog-to-digital conversion, RF signal storage (e.g., in raw form) and RF signal playback and analysis.

The data processing PC 808 runs an application (e.g., such as the MATLAB® computing environment, commercially available from The MathWorks of Natick, Mass.) that calls upon the IEEE 802.11 data processing functions of the vector signal analyzer 810 to break down stored RF signal data into parameters that can be compared (e.g., WIC to WIC). To this end, the vector signal analyzer 810 allows the application running on the data processing PC 808 to be its controller and to extract RF signal characteristics therefrom.

In one embodiment, in order to filter frames from transmitters other than the client 814 (i.e., so that fingerprinting of the client 814 is not corrupted by noise or collisions), the application running on the data processing PC 808 verifies that captured RF transmission frames are valid (i.e., from the client 814) before adding the frames to a data set for performing fingerprinting. In one embodiment, this is accomplished by first deinterleaving the per-subcarrier symbols in the captured frames. The symbols are then converted to a bit stream, convolutional coding is undone (e.g., using a Viterbi routine), and the symbols are descrambled. The source MAC address can then be extracted and verified. Only frames with the correct source MAC address are then included in the data set for performing fingerprinting.

In alternative embodiments of the exemplary network 800, the access point antenna 818 and the sniffer antenna 820 are combined into a single antenna whose signal is directionally coupled between the access point 804 and the vector signal analyzer 810.

Figure 2:
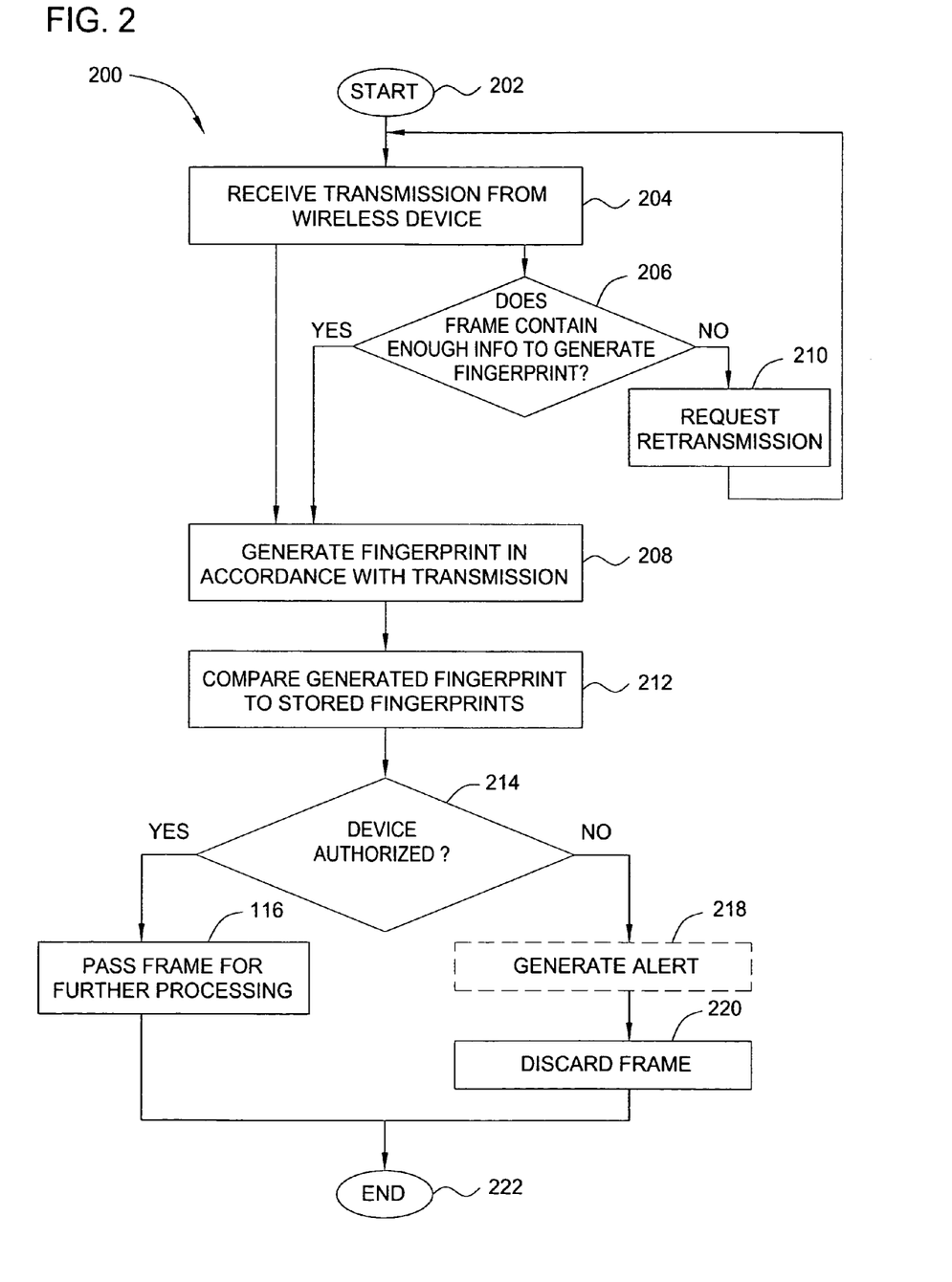
FIG. 2 is a flow diagram illustrating one embodiment of a method for authenticating a wireless network device, according to the present invention.

FIG. 2 is a flow diagram illustrating one embodiment of a method 200 for authenticating a wireless network device, according to the present invention. The method 200 may be implemented, for example, in a wireless network security system or a wireless LAN access point that can generate or has access to wireless device fingerprints such as those discussed above with respect to FIG. 1.

The method 200 is initialized at step 202 and proceeds to step 204, where the method 200 receives a data link layer frame from a transmitting wireless device. The method 200 then proceeds to step 206 and determines whether the received data link layer frame contains enough information to generate a fingerprint for the transmitting wireless device.

If the method 200 concludes in step 206 that there is insufficient information to generate a fingerprint, the method 200 proceeds to step 210 and requests an additional communication from the transmitting wireless device, e.g., by requesting retransmission of the data link layer frame. In one embodiment, the request for retransmission is replaced or augmented with a request to provide additional data link layer frames (i.e., in addition to the frame to be retransmitted). Once the data link layer frame is resent, the method 200 returns to step 204 and proceeds as described above to re-attempt fingerprint generation, including both the previous and new frames together in determining whether there is enough information to generate a fingerprint.

Alternatively, if the method 200 concludes in step 206 that the data link layer frame does contain enough information to generate a fingerprint, the method 200 proceeds to step 208 and generates a fingerprint for the transmitting wireless device, in accordance with the received data link layer frame. In one embodiment, the fingerprint is generated in the manner described above with respect to FIG. 1. In one embodiment, the fingerprint is generated by an event profiling engine that adaptively profiles the RF signal characteristics extracted from the data link layer frame. In one embodiment, the event profiling engine is a Bayesian reasoning engine.

In step 212, the method 200 compares the generated fingerprint to one or more stored fingerprints. In one embodiment, the method 200 produces a similarity score indicative of the degree of similarity between the generated fingerprint and the stored fingerprint. In one embodiment, the fingerprints are compared in accordance with the method described in greater detail with reference to FIG. 3.

In step 214, the method 200 determines, based on the comparison performed in step 212, whether the transmitting wireless device is authorized user to access the wireless computing network. In one embodiment, the authorization of the transmitting wireless device depends on the device's location (e.g., in most locations, such as a corporate office, only known fingerprints are accepted, but in certain locations, such as a café, even unknown fingerprints are accepted). If the method 200 concludes in step 214 that the transmitting wireless device is an authorized device, the method 200 proceeds to step 216 and passes the data link layer frame on to a higher level of the network stack for further processing in accordance with the network protocols in use (e.g., TCP/IP) before the method 200 terminates in step 222.

Alternatively, if the method 200 concludes in step 214 that the transmitting wireless device is not authorized to access the wireless computing network, the method 200 proceeds to optional step 218 (illustrated in phantom) and generates an alert. The alert indicates that a possible intrusion has been attempted in the wireless computing network. In one embodiment, the alert includes information regarding the fingerprint of the transmitting wireless device (e.g., when the fingerprint was observed, from where the transmitting wireless device is transmitting and the like). The generated alert may be forwarded to an intrusion detection or intrusion prevention system (e.g., to a sensor capable of receiving alerts from a third party or to a management station configured to receive alerts from a plurality of sensors).

In step 220, the method 200 discards the data link layer frame. In another embodiment, the method 200 may additionally, or alternatively, use a frame injection technique to disrupt the communications sessions of the transmitting wireless device. The method 200 then terminates in step 222.

In one embodiment, the method 200 for fingerprint comparison is repeated, either periodically or on demand, as a means of continually monitoring the integrity of a wireless communication session (i.e., re-authentication). In such subsequent invocations of the method 200, rather than requesting retransmission of data link layer frames in step 210, the method 200 may alternatively wait for additional frames to be received.

In another embodiment, wireless device authentication is performed at the initial establishment of a wireless session, and then one or more low-complexity RF signal characteristics (e.g., angle of arrival, signal strength, center frequency error or the like) are extracted from data link layer frames on a periodic or continual basis to determine how a given data link layer frame emitted from a wireless device should be treated (e.g., ignore the frame, generate a security alert, etc.).

Figure 3:
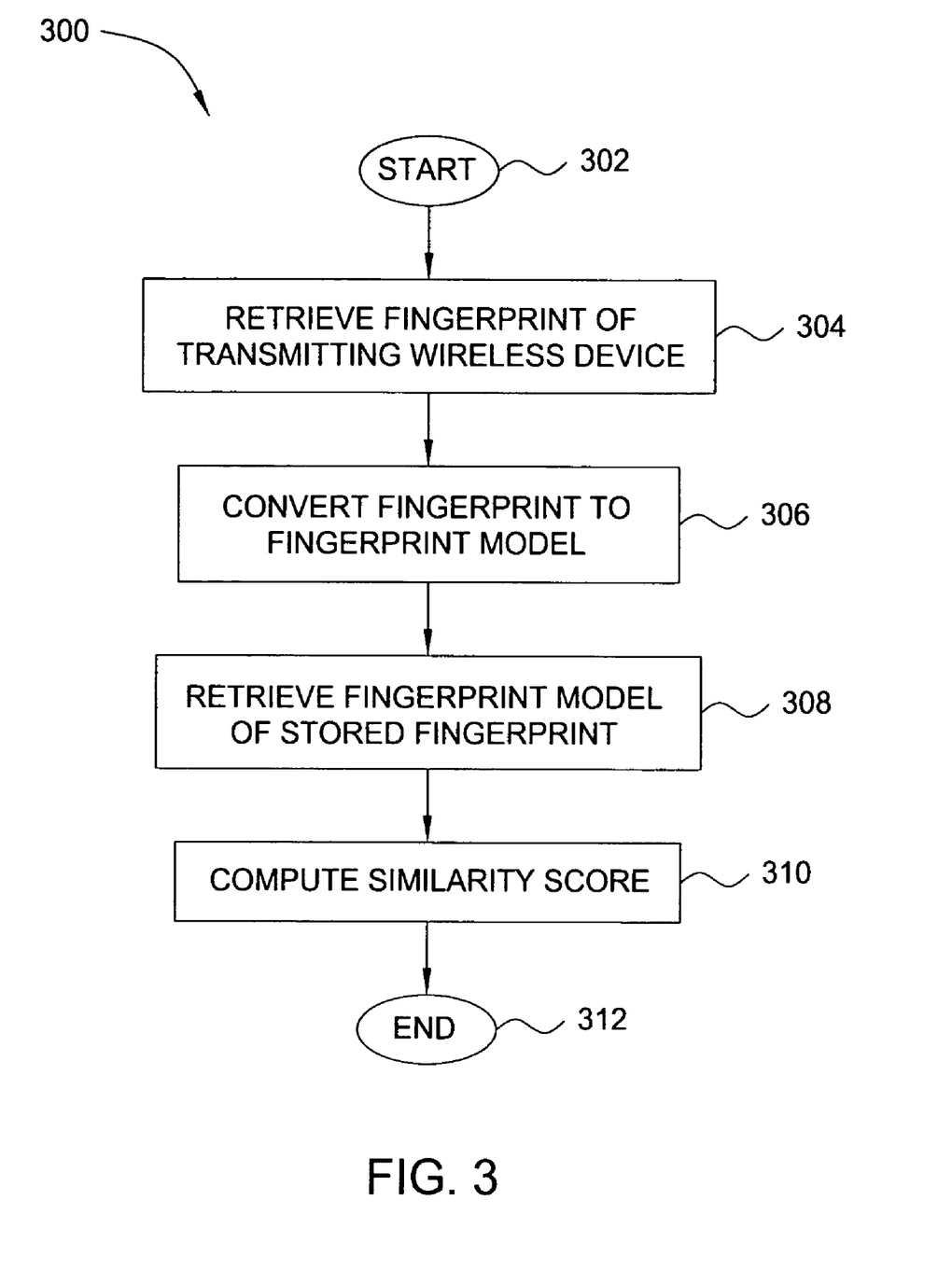
FIG. 3 is a flow diagram illustrating one embodiment of a method for comparing wireless device fingerprints, according to the present invention.

FIG. 3 is a flow diagram illustrating one embodiment of a method 300 for comparing wireless device fingerprints, according to the present invention. The method 300 may be implemented, for example, in accordance with step 212 of the method 200 in order to identify a transmitting wireless device.

Figure 4:
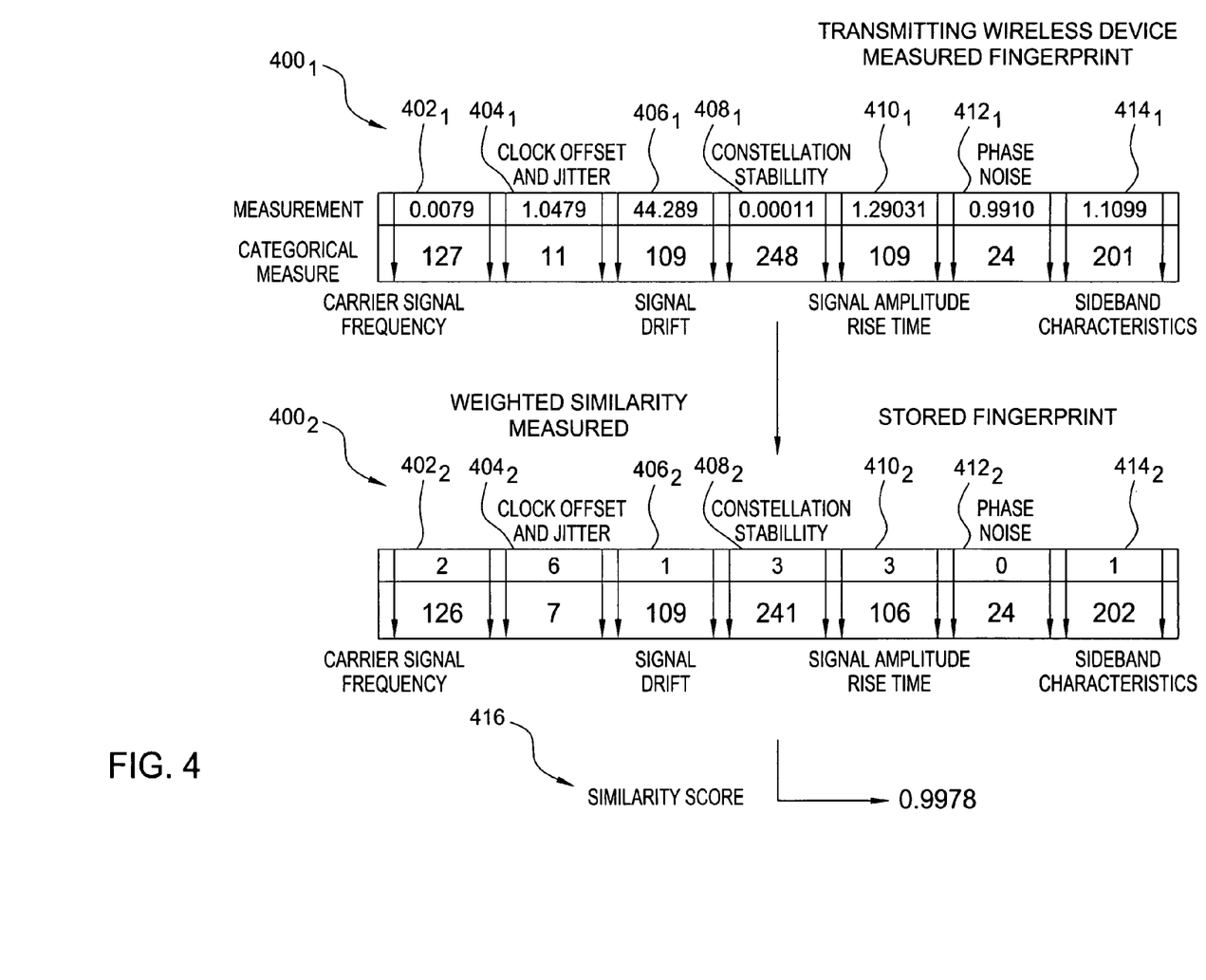
FIG. 4 is a diagram illustrating a comparison of two exemplary fingerprints.

The method 300 is initialized at step 302 and proceeds to step 304, where the method 300 retrieves a measured fingerprint of a transmitting wireless device (e.g., in accordance with the method 200). In step 306, the method 300 converts this fingerprint to a fingerprint model. The fingerprint model comprises categorical measurements for the RF signal characteristics that comprise the measured fingerprint. FIG. 4, for example, is a diagram illustrating a comparison of two exemplary fingerprints. The fingerprint model $400_1$ for the transmitting wireless device includes categorical measurements for carrier signal frequency $402_1$, clock offset and jitter $404_1$, signal drift $406_1$, constellation stability $408_1$, signal amplitude rise time $410_1$, phase noise $412_1$ and sideband characteristics $414_1$.

In step 308, the method 300 retrieves a fingerprint model for a stored fingerprint. Like the fingerprint model for the transmitting wireless device, the fingerprint model for the stored fingerprint comprises categorical measurements that correspond to the stored fingerprint. For example, the fingerprint model $400_2$ for the stored fingerprint in FIG. 4 includes categorical measurements for carrier signal frequency $402_2$, clock offset and jitter $404_2$, signal drift $406_2$, constellation stability $408_2$, signal amplitude rise time $410_2$, phase noise $412_2$ and sideband characteristics $414_2$. Additionally, the fingerprint model for the stored fingerprint also comprises a tolerance or range for each of the categorical measurement (not depicted). The tolerance or range specifies a degree of similarity that the corresponding measurement of another fingerprint model must fulfill in order to be considered a match to the stored fingerprint model's measurement (e.g., ±0.05).

In step 310, the method 300 computes a similarity score indicative of the degree of similarity between the fingerprint for the transmitting wireless device and the stored fingerprint. The similarity score takes into account at least one of the corresponding categorical measurements (including the tolerance specified by the stored fingerprint model). For example, the exemplary fingerprint models $400_1$, and $400_2$ of FIG. 2 produce a similarity score 416 of 0.9978. In one embodiment, the computation is performed using a Bayes network. In one embodiment, a similarity measure must be substantially 100 percent in order to be deemed a match. In another embodiment, a threshold value will determine whether a similarity measure is high enough to indicate a match. The threshold value may be fixed, or may be adjustable (e.g., by a system administrator) based on risk tolerance for false positives and false negatives.

The method 300 terminates in step 312.

In one embodiment, the center frequency error provides an indirect indication of a WIC's current thermal conditions, which can be used to determine more precise tolerances for the values of other thermally varying signal characteristics used in computing a similarity score, thereby improving the fidelity of the scoring scheme. The more precise tolerances are determined by mapping the measured center frequency error to the values of other signal characteristics that were previously measures under similar thermal conditions. In another embodiment, a thermally dependent signal characteristic other than center frequency error is used to provide an indirect indication of the WIC's thermal conditions.

Figure 5:
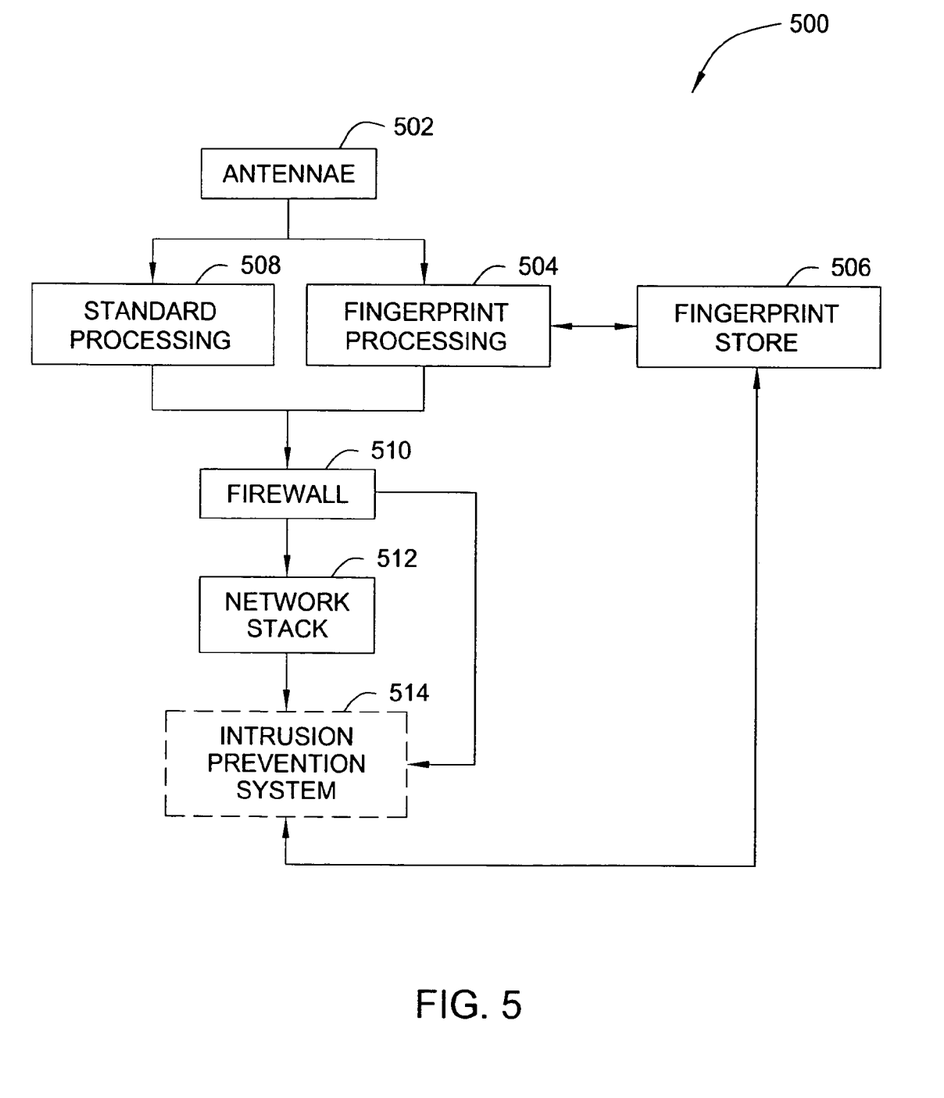
FIG. 5 is a high-level block diagram of one embodiment of a wireless network security system, according to the present invention.

FIG. 5 is a high-level block diagram of one embodiment of a wireless network security system 500, according to the present invention. The system 500 may be configured, for example, to learn and compare fingerprints of transmitting wireless devices as described above.

In one embodiment, the system 500 comprises at least one antenna 502, a fingerprint processing module 504, a fingerprint store 506, a standard processing module 508, a firewall module 510 and a network stack module 512. In another embodiment, the system 500 further comprises an intrusion prevention system module 514 (illustrated in phantom).

The antennae 502 are adapted to receive RF signals in the frequency band(s) allocated for the wireless computing network. In one embodiment, the system 500 comprises between one and eight antennae 502. In one embodiment, each of the antennae 502 comprise a multi-element direction finding (DF) phased array antenna (to allow for determination of angle of arrival of a specific signal) coupled to a vector modulator, a low-noise amplifier and a front-end receiver (to bring the RF signal to baseband). The antennae 502 may be connected to a housing of the system 500 (not shown), or may alternatively be remotely connected by cable (e.g., 10 meters distance). In one multi-antennae embodiment, signals from the antennae 502 may be multiplexed together and selected apart using a high-speed switch for further processing. In one embodiment, the allocated frequency band is 2.4 GHz (e.g., for the 802.11b and 802.11g protocols) or 5 GHz (e.g., for the 802.11a protocol).

The antennae 502 are further configured to provide received RF signals to the fingerprint processing module 504 and to the standard processing module 508. The standard processing module 508 receives the raw RF signal from the antennae 502 and performs known signal processing in order to produce data link layer frames from the RF signal.

The fingerprint processing module 504 processes the RF signals received from the antennae 502 and produces fingerprints of transmitter RF signal characteristics, for example in accordance with the methods described above. In one embodiment, the fingerprint processing module 504 also extracts the MAC address contained in the received data link layer frame. In addition, the fingerprint processing module 504 also compares the produced fingerprints to stored fingerprints contained in the fingerprint store 506, in order to attempt to recognize the transmitter as described above.

In one embodiment, the fingerprint processing module 504 also demodulates and decodes additional RF signals. Such signals may include signals from at least one of: signals from Bluetooth devices, cordless phones, baby monitors, handheld radios. The additional signals may also include signals from sources of interference, such as microwave ovens and the like. In such embodiments, the fingerprint processing module 504 includes advanced fault diagnosis using interference profiling, including the use of pre-developed profiles of devices that are known to be disruptive emitters. Interference profiling and comparison to a knowledge base of well-known disruptive devices can form the basis of an automated fault diagnosis system that will significantly reduce wireless network operator effort and downtime. In one embodiment, this knowledge base includes a description of the interference of common disruptive emitters such as those described above. These patterns can be encoded as heuristics within a forward-reasoning system, such as the Production-Based Expert System Toolset described by U. Lindqvist and P. A. Porras in "Detecting Computer and Network Misuse Through the Production-Based Expert System Toolset (P-BEST)", proc. 1999 IEEE Symposium on Security and Privacy, Oakland, Calif., May 1999, which is herein incorporated by reference in its entirety. This system can then recognize RF disruption patterns that are consistent with the disruption patterns of a known type of disruptive emitter.

In yet another embodiment, the fingerprint processing module 504 comprises an expert reasoning engine for detecting location-fixed device position violations, which will identify when a known "fixed location" transmitter, such as a wireless network access point, is not transmitting from its expected location. Out-of-bounds transmission recognition detects transmissions that are operating outside of an acceptable geographic perimeter (e.g., transmissions from a parking lot or a different floor within a building). In one embodiment, a real-time range-based mapping system is provided to enable administrators to locate malicious transmissions to within a few meters and to provide relative position information for graphical wireless network mapping of transmitting wireless devices.

Although illustrated as discrete modules for clarity in FIG. 5, those skilled in the art will appreciate that the standard processing module 508 and the fingerprint processing module 504 may share hardware, firmware and/or software. Moreover, the fingerprint processing module 504 may operate in parallel, in series or interleaved with the operation of the standard processing module 508.

The fingerprint store 506 contains stored device fingerprints and their associated tolerances, as described above. In one embodiment, the fingerprint store 506 is an extension of an address resolution protocol (ARP) cache. In TCP/IP network devices, the ARP cache provides a mapping between IP address and MAC addresses. In this embodiment, the fingerprint store 506 augments the ARP cache to provide a mapping comprising IP address, MAC address, fingerprint and fingerprint tolerances.

In one embodiment, the contents of the fingerprint store 506 can be exported to and imported from other wireless network security systems. In one embodiment, this sharing of fingerprint data occurs in a peer-to-peer manner between systems or devices. In another embodiment, the sharing occurs under the control and direction of at least one management station, to which individual devices or systems upload new fingerprint data (either as the fingerprints are created or at the command of the management station). The management station can then send the fingerprints to other devices or systems, either proactively or in response to queries from the devices or systems (e.g., "Do you have a fingerprint on file that is similar to the fingerprint of this new device I have just encountered?"). This will enable the tracking of transmitters across a physical space (e.g., within an organization, building, campus, city, etc.). In the embodiment where the antennae 502 are configured to provide localization (direction and range finding) information, the location information may also be stored in the fingerprint store 506.

The firewall module 510 is configured to accept or deny the data link layer frame(s), once the fingerprint processing module 504 has determined whether they are associated with authorized devices. Frames associated with authorized devices are accepted by the firewall module 510 and passed to the network stack module 512. In one embodiment, frames that are not associated with authorized devices are dropped by the firewall module 510 (e.g., not passed for further processing), which also releases all resources (e.g., memory) allocated to the dropped frames. In another embodiment, the firewall module 510 is configured to send an alert to the intrusion prevention system 514 module if the frames are associated with an unauthorized device (instead of or in addition to dropping the frames). In yet another embodiment, the firewall module 510 is configured to inject frames into the wireless computing network to disrupt the communications of the unauthorized device.

The network stack module 512 is configured to receive accepted data link layer frames from the firewall module 510 and to apply standard processing to the received frames in accordance with the network protocols in use (e.g., TCP/IP processing, wireless encryption protocol (WEP) or virtual private network (VPN) decryption and the like).

The optional intrusion prevention system module 514 is configured to perform inline packet inspection and anomaly detection using known techniques. The intrusion prevention system is configured to access the fingerprint store 506 and to determine (and report) the fingerprints of devices that are deemed suspicious. In one embodiment, the intrusion prevention system module 514 is further configured to respond to suspicious activity by adjusting the contents of the fingerprint store 506 to mark certain devices as "unauthorized" (e.g., by removing the device from an authorized list or by flagging the device as blacklisted). In one embodiment, information regarding blacklisted devices is shared among devices and wireless network security systems (e.g., in a peer-to-peer manner or under the control and direction of a management station as described above).

Figure 6:
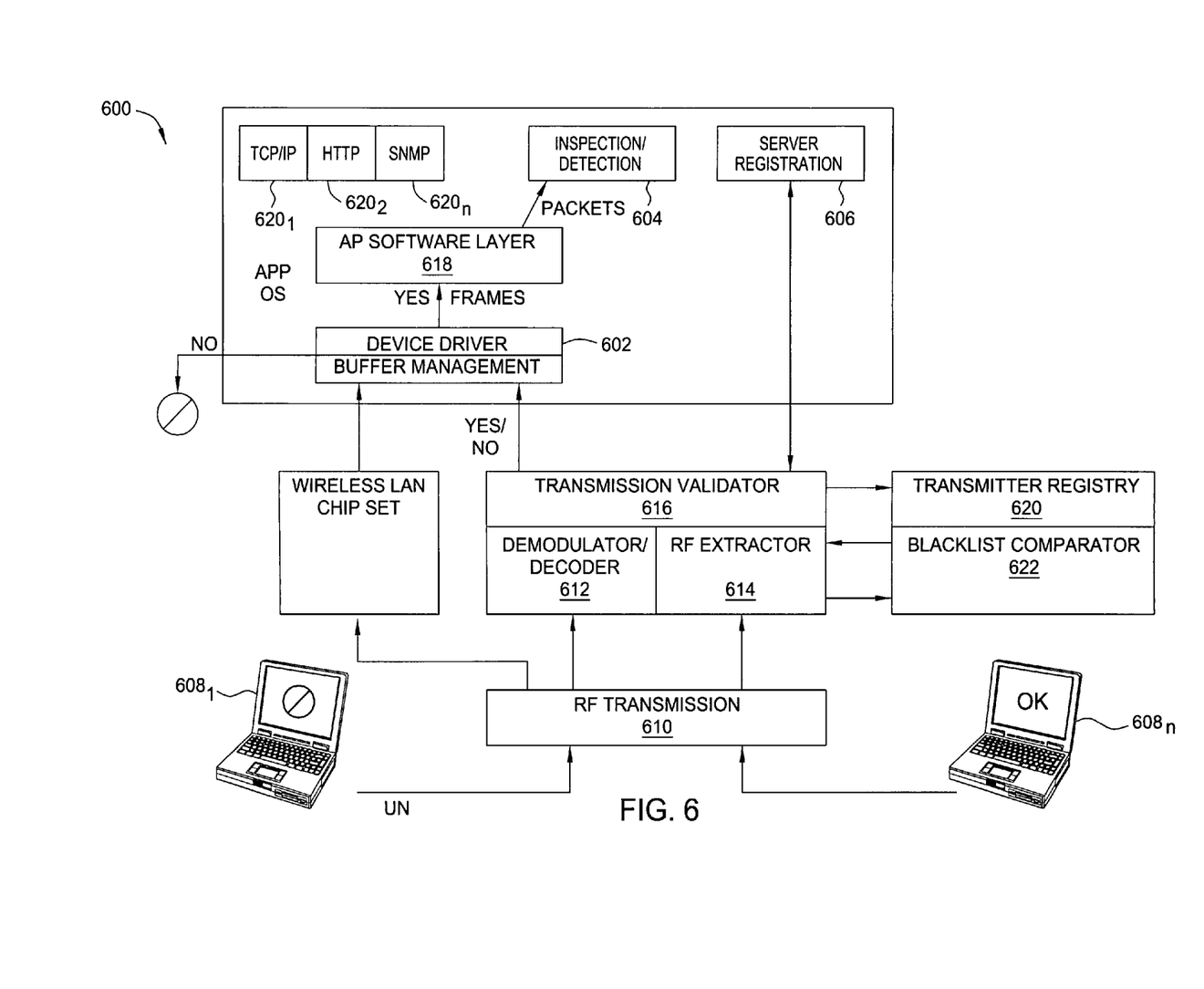
FIG. 6 is a high-level block diagram illustrating one embodiment of a firewall implementation, according to the present invention.

FIG. 6 is a high-level block diagram illustrating one embodiment of a firewall implementation 600, according to the present invention. In one embodiment, the firewall 600 is an L-1 firewall (i.e., layer 1 or physical layer). The firewall 600 performs transmitter and access point RF signal registration in accordance with the fingerprinting methods described above.

The firewall 600 comprises a device driver 602, an inline packet inspection and anomaly detection module 604 and a server registration management module 606, in addition to various protocol processing modules $620_1$-$620_n$ (hereinafter collectively referred to as protocol processing modules 620") and a software layer 618.

When a wireless device $608_1$-$608_n$ (hereinafter collectively referred to as wireless devices 608") attempts to access a wireless network, RF transmissions 610 are picked up from the wireless device 608 and passed to a demodulating/decoding module 612 and a RF characteristic extraction module 614. The demodulating/decoding module 612 demodulates and decodes the RF transmission 610, while the RF characteristic extraction module 614 extracts RF characteristics from the RF transmission 610 that may be useful in generating a fingerprint of the wireless device 608. In addition, the RF characteristic extraction module 614 extracts the reported MAC address of the wireless device 608. A transmission validator application 616 then compares the RF transmission 610 for the reported MAC address, with the aid of a transmitter registry 620 containing the fingerprints of authorized wireless devices and a blacklist comparator 622 containing the fingerprints of blacklisted wireless devices. If the RF transmission 610 is validated, the transmission validator application 616 then passes the data link layer frames of the RF transmission 610 to the device driver 602 of the firewall 600, as well as to the server registration management module 606.

The device driver 602 in turn passes the validated data link layer frames to the software layer 618, which processes the data link layer frames and passes packets to the inline packet inspection and anomaly detection module 604 for post-encryption inline packet inspection and anomaly detection. Depending on policy, a questionable packet received from an authorized wireless device 608 may result in the authorized wireless device 608 being blacklisted. Unvalidated data link layer frames may be dropped, or other more proactive measures may be taken against the wireless devices 608 from which the unvalidated frames were received. In any event, unvalidated frames (i.e., originating from unknown or unauthorized wireless devices) are excluded from layer 2 stack access.

As described above, the firewall 600 may export and share fingerprints for wireless devices 608 with other firewalls.

Figure 7:
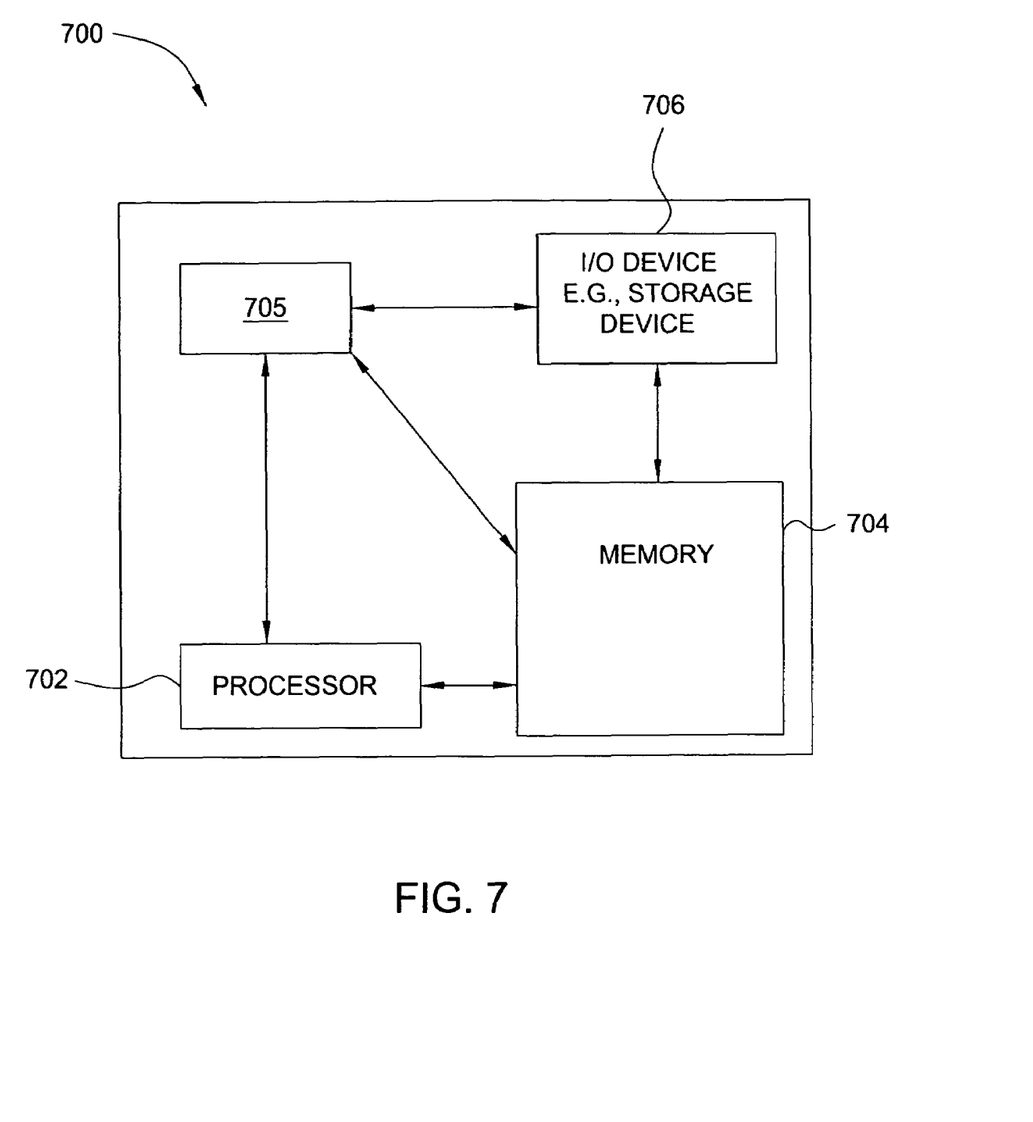
FIG. 7 is a high level block diagram of the wireless device fingerprinting method that is implemented using a general purpose computing device.

FIG. 7 is a high level block diagram of the wireless device fingerprinting method that is implemented using a general purpose computing device 700. In one embodiment, a general purpose computing device 700 comprises a processor 702, a memory 704, a fingerprinting module 705 and various input/output (I/O) devices 706 such as a display, a keyboard, a mouse, a modem, and the like. In one embodiment, at least one I/O device is a storage device (e.g., a disk drive, an optical disk drive, a floppy disk drive). It should be understood that the fingerprinting module 705 can be implemented as a physical device or subsystem that is coupled to a processor through a communication channel.

Alternatively, the fingerprinting module 705 can be represented by one or more software applications (or even a combination of software and hardware, e.g., using Application Specific Integrated Circuits (ASIC), Field Programmable Gate Arrays (FPGAs) or Digital Signal Processors (DSPs)), where the software is loaded from a storage medium (e.g., I/O devices 706) and operated by the processor 702 in the memory 704 of the general purpose computing device 700. Thus, in one embodiment, the fingerprinting module 705 for fingerprinting wireless devices described herein with reference to the preceding Figures can be stored on a computer readable medium or carrier (e.g., RAM, magnetic or optical drive or diskette, and the like).

Those skilled in the art will appreciate that the inventive system and method described herein do not require the cooperation of the transmitting wireless devices (i.e., permission is not required to perform fingerprinting). However, in some embodiments of the invention that involve cooperative transmitters, all authorized devices may be required to periodically transmit a specific ID frame or packet that can be utilized, for example, as a "light-weight" fingerprint (e.g., the presence of the ID frame in a series of frames indicates authorization). Such ID frames may, in some embodiments, be modified so as to lower the computational burden (and other resource requirements) to generate fingerprints. For example, a packet can be intentionally transmitted at a specific signal strength (to assist in location detection), with a specific data pattern (to assist in extracting the rise time) and/or using a specific modulation scheme (to assist in extracting constellation, jitter or phase shift).

Moreover, the present invention may be implemented as either an "active" or a "passive" system. In the active embodiment, an RF fingerprinting authentication scheme is integrated into a wireless network infrastructure as a filter against rogue transmissions. In the passive embodiment (i.e., disassociated from the wireless infrastructure), an RF fingerprinting scheme is incorporated to validate that clients only communicate with valid wireless infrastructure (e.g., a hotspot validating that no other devices are spoofing clients into using the wrong access points).

Although the present invention has largely been described herein within the context of deployment at a wireless network access point, those skilled in the art will appreciate that the invention may also be deployed at client devices (i.e., transmitters), including, but not limited to: desktop computers, laptop computers, notebook computers, hand-held computers, personal digital assistants, gaming consoles, cellular and other types of telephones, personal audio players (e.g., MP3 players), televisions, entertainment centers, digital video recorders, digital cameras, watches, household appliances, vending machines, automobiles, process control devices and other devices that comprise wireless network connectivity. Further, the present invention may be deployed in connection with an access point that is embedded within another device (e.g., a router, a switch or other similar networking infrastructure equipment), or the transmitter/client device itself may be an access point as well as a client to a further access point. The invention is also applicable for deployment in ad-hoc networks, which use no access points, and in "tower-to-tower" networking applications (e.g., WiMax, satellite and cellular communications, etc.).

Further, the invention has been described herein in terms of fingerprinting the RF representation of a data link layer frame. For the purposes of the invention, the RF representation may be extracted from a single (i.e., complete) data link layer frame, from one or more portions of a data link layer frame, or from multiple data link layer frames. Such portions or single or multiple data link layer frames may comprise single or multiple lower or higher level protocol frames (e.g., an 802.11 PHY Layer Convergence Procedure (PLCP) protocol data unit (PPDU) may be used).

Thus, the present invention represents a significant advancement in the field of wireless network security. Embodiments of the present invention exploit a rich set of information from the physical layer that is normally discarded by typical wireless network security systems, in order to create unique "fingerprints" of wireless network devices. This fingerprinting capability can be adapted to support transmitter-based access control, wireless local area network (LAN) intrusion detection, malicious or stolen device tracking, clone detection and product market surveys, among other applications.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, for securing a wireless computing network, comprising:
   means for receiving a communication from an unidentified transmitter;
   means for identifying the transmitter in accordance with a fingerprint generated from one or more radio frequency signal characteristics extracted from the communication;
   means for making one or more access control decisions in response to an identity of the transmitter; and
   a fingerprint store comprising fingerprint data for one or more transmitters known to the wireless computing network, wherein the fingerprint store is an extension of an address resolution protocol cache.

2. The system of claim 1, wherein at least some contents of the fingerprint store are exported to other wireless computing network security systems.

3. The system of claim 1, wherein at least some contents of the fingerprint store are imported from other wireless computing network security systems.

4. The system of claim 1, wherein the means for making one or more access control decisions comprises:
   a firewall module configured to accept or deny data link layer frames of the communication based on the fingerprint.

5. The system of claim 4, wherein the firewall module is further configured to:
   pass data link layer frames associated with authorized transmitters to a network stack module; and
   drop data link layer frames that are not associated with the authorized transmitters.

6. The system of claim 4, wherein the firewall module is further configured to send an alert to an intrusion prevention system if the data link layer frames are not associated with the authorized transmitters.

7. The system of claim 4, wherein the firewall module is further configured to disrupt communications of unauthorized transmitters.

8. The system of claim 1, further comprising:
   an intrusion prevention system configured to perform inline packet inspection and anomaly detection.

9. The system of claim 1, wherein the means for receiving comprises one or more antennas.

10. The system of claim 1, wherein the means for identifying comprises:
    a standard processing module configured to extract a data link layer frame from a raw radio frequency signal associated with the communication; and
    a fingerprint processing module configured to produce the fingerprint.

11. The system of claim 10, wherein the fingerprint processing module is further configured to extract a medium access control address contained in the communication.

12. The system of claim 10, wherein the fingerprint processing module is further configured to demodulate and decode additional radio frequency signals not associated with the transmitter.

13. The system of claim 10, wherein the fingerprint processing module comprises an expert reasoning engine for detecting location-fixed transmitter position violations.

14. A method for securing a wireless computing network, the method comprising:
    receiving a communication from an unidentified transmitter;
    identifying the transmitter in accordance with a first fingerprint generated from one or more radio frequency signal characteristics extracted from the communication;
    making one or more access control decisions in response to an identity of the transmitter; and
    storing one or more stored fingerprints representing one or more transmitters known to the wireless computing network in a fingerprint store, wherein the fingerprint store is an extension of an address resolution protocol cache.

15. The method of claim 14, wherein the one or more radio frequency signal characteristics are extracted from a physical layer frame of the communication.

16. The method of claim 14, wherein the identifying comprises:
    comparing the first fingerprint to at least one of the one or more stored fingerprints.

17. The method of claim 16, wherein the comparing comprises:
    generating for each comparison performed in accordance with the comparing a similarity score indicative of a degree of similarity between the first fingerprint and a respective one of the one or more stored fingerprints.

18. The method of claim 16, wherein the comparing comprises:

converting the first fingerprint to a first fingerprint model, the first fingerprint model comprising one or more categorical measurements for radio frequency signal characteristics corresponding to the first fingerprint; and comparing the first fingerprint model to a stored fingerprint model of one of the one or more stored fingerprints, the stored fingerprint model comprising one or more categorical measurements for radio frequency signal characteristics corresponding to the one of the one or more stored fingerprints.

19. The method of claim 18, wherein the stored fingerprint model further comprises:

a tolerance associated with each of the one or more categorical measurements, the tolerance specifying a degree of similarity that an associated one of the one or more categorical measurements must meet with regard to a corresponding one of the one or more categorical measurements of the first fingerprint model in order to be considered a match.

20. The method of claim 14, wherein the making one or more access control decisions comprises:

registering the transmitter such that the transmitter is allowed to communicate with an infrastructure of the wireless computing network.

21. The method of claim 14, wherein the making one or more access control decisions comprises:

authenticating the transmitter if the first fingerprint matches at least one of the one or more stored fingerprints that corresponds to an authorized user of the wireless computing network.

22. The method of claim 14, wherein the making one or more access control decisions comprises:

authenticating the transmitter if the first fingerprint indicates that an estimated location of the transmitter is within a permissible range.

23. The method of claim 14, wherein the making one or more access control decisions comprises:

generating an alert if the first fingerprint matches at least one of the one or more stored fingerprints that corresponds to a known source of malicious activity, the alert indicative of a possible intrusion in the wireless computing network; and forwarding the alert to an intrusion prevention system.

24. The method of claim 14, wherein the making one or more access control decisions comprises:

generating an alert if the first fingerprint does not match at least one of the one or more stored fingerprints that corresponds to an authorized user of the wireless computing network, the alert indicative of a possible intrusion in the wireless computing network; and forwarding the alert to an intrusion prevention system.

25. The method of claim 24, wherein the alert includes information about the first fingerprint.

26. The method of claim 14, wherein the making one or more access control decisions comprises:

determining that the transmitter is not an authorized user of the wireless computing device, in accordance with the first fingerprint; and disrupting communication sessions associated with the transmitter.

27. The method of claim 26, wherein the disrupting is accomplished in accordance with a frame injection technique.

28. The method of claim 14, wherein the making one or more access control decisions comprises:

sharing the first fingerprint with at least one other computing network.

29. The method of claim 28, further comprising:

tracking a location of the transmitter in accordance with the first fingerprint.

30. The method of claim 29, wherein the tracking comprises:

receiving a new communication from the transmitter;

generating a new fingerprint from one or more radio frequency signal characteristics extracted from the new communication; and comparing the new fingerprint to the first fingerprint.

31. The method of claim 14, further comprising:

providing one or more data link layer frames associated with the transmitter to a network firewall; and indicating to the network firewall whether the transmitter has been identified as an authorized user of the wireless computing network or an unauthorized user of the wireless computing network, in accordance with the first fingerprint.

32. The method of claim 14, wherein the making one or more access control decisions comprises:

marking the transmitter as blacklisted if the first fingerprint does not match at least one of the one or more stored fingerprints that corresponds to an authorized user of the wireless computing network.

33. The method of claim 14, wherein the first fingerprint is generated periodically.

34. The method of claim 14, further comprising:

receiving a new communication from the transmitter; and recognizing the transmitter in accordance with the first fingerprint.

35. A computer readable storage medium containing an executable program for securing a wireless computing network, where the program performs steps comprising:

receiving a communication from an unidentified transmitter;

identifying the transmitter in accordance with a first fingerprint generated from one or more radio frequency signal characteristics extracted from the communication;

making one or more access control decisions in response to an identity of the transmitter; and storing one or more stored fingerprints representing one or more transmitters known to the wireless computing network in a fingerprint store, wherein the fingerprint store is an extension of an address resolution protocol cache.

36. The computer readable storage medium of claim 35, wherein the one or more radio frequency signal characteristics are extracted from a physical layer frame of the communication.

37. The computer readable storage medium of claim 35, wherein the identifying comprises:

comparing the first fingerprint to at least one of the one or more stored fingerprints.

38. The computer readable storage medium of claim 37, wherein the comparing comprises:

generating for each comparison performed in accordance with the comparing a similarity score indicative of a degree of similarity between the first fingerprint and a respective one of the one or more stored fingerprints.

39. The computer readable storage medium of claim 37, wherein the comparing comprises:

converting the first fingerprint to a first fingerprint model, the first fingerprint model comprising one or more categorical measurements for radio frequency signal characteristics corresponding to the first fingerprint; and comparing the first fingerprint model to a stored fingerprint model of one of the one or more stored fingerprints, the stored fingerprint model comprising one or more categorical measurements for radio frequency signal characteristics corresponding to the one of the one or more stored fingerprints.

40. The computer readable storage medium of claim 39, wherein the stored fingerprint model further comprises:
a tolerance associated with each of the one or more categorical measurements, the tolerance specifying a degree of similarity that an associated one of the one or more categorical measurements must meet with regard to a corresponding one of the one or more categorical measurements of the first fingerprint model in order to be considered a match.

41. The computer readable storage medium of claim 35, wherein the making one or more access control decisions comprises:
registering the transmitter such that the transmitter is allowed to communicate with an infrastructure of the wireless computing network.

42. The computer readable storage medium of claim 35, wherein the making one or more access control decisions comprises:
authenticating the transmitter if the first fingerprint matches at least one of the one or more stored fingerprints that corresponds to an authorized user of the wireless computing network.

43. The computer readable storage medium of claim 35, wherein the making one or more access control decisions comprises:
authenticating the transmitter if the first fingerprint indicates that an estimated location of the transmitter is within a permissible range.

44. The computer readable storage medium of claim 35, wherein the making one or more access control decisions comprises:
generating an alert if the first fingerprint matches at least one of the one or more stored fingerprints that corresponds to a known source of malicious activity, the alert indicative of a possible intrusion in the wireless computing network; and
forwarding the alert to an intrusion prevention system.

45. The computer readable storage medium of claim 35, wherein the making one or more access control decisions comprises:
generating an alert if the first fingerprint does not match at least one of the one or more stored fingerprints that corresponds to an authorized user of the wireless computing network, the alert indicative of a possible intrusion in the wireless computing network; and
forwarding the alert to an intrusion prevention system.

46. The computer readable storage medium of claim 45, wherein the alert includes information about the first fingerprint.

47. The computer readable storage medium of claim 35, wherein the making one or more access control decisions comprises:
determining that the transmitter is not an authorized user of the wireless computing device, in accordance with the first fingerprint; and
disrupting communication sessions associated with the transmitter.

48. The computer readable storage medium of claim 47, wherein the disrupting is accomplished in accordance with a frame injection technique.

49. The computer readable storage medium of claim 35, wherein the making one or more access control decisions comprises:
sharing the first fingerprint with at least one other computing network.

50. The computer readable storage medium of claim 47, further comprising:
tracking a location of the transmitter in accordance with the first fingerprint.

51. The computer readable storage medium of claim 50, wherein the tracking comprises:
receiving a new communication from the transmitter;
generating a new fingerprint from one or more radio frequency signal characteristics extracted from the new communication; and
comparing the new fingerprint to the first fingerprint.

52. The computer readable storage medium of claim 35, further comprising:
providing one or more data link layer frames associated with the transmitter to a network firewall; and
indicating to the network firewall whether the transmitter has been identified as an authorized user of the wireless computing network or an unauthorized user of the wireless computing network, in accordance with the first fingerprint.

53. The computer readable storage medium of claim 35, wherein the making one or more access control decisions comprises:
marking the transmitter as blacklisted if the first fingerprint does not match at least one of the one or more stored fingerprints that corresponds to an authorized user of the wireless computing network.

54. The computer readable storage medium of claim 35, wherein the first fingerprint is generated periodically.

55. The computer readable storage medium of claim 35, further comprising:
receiving a new communication from the transmitter; and
recognizing the transmitter in accordance with the first fingerprint.

* * * * *